United States Patent [19]

Albal et al.

[11] Patent Number: 5,226,073
[45] Date of Patent: Jul. 6, 1993

[54] TELEPHONE NETWORK CREDIT CARD CALLING APPARATUS AND METHOD OF TELEPHONE NETWORK OPERATION WITH CREDIT CARD COMPANIES

[75] Inventors: Nandakishore A. Albal, Pataskala; Anit M. Patel, Pickerington, both of Ohio

[73] Assignee: AT&T Bell Laboratories, Murray Hill, N.J.

[21] Appl. No.: 941,772

[22] Filed: Sep. 4, 1992

Related U.S. Application Data

[63] Continuation of Ser. No. 636,535, Dec. 31, 1990, abandoned.

[51] Int. Cl.⁵ .......................................... H04M 11/00
[52] U.S. Cl. ....................................... 379/91; 379/144; 379/154; 379/32
[58] Field of Search ............... 379/91, 143-145, 379/154, 155, 130-132, 123, 32, 33, 134

[56] References Cited

U.S. PATENT DOCUMENTS

| | | |
|---|---|---|
| 4,162,377 | 7/1979 | Mearns . |
| 4,191,860 | 3/1980 | Weber . |
| 4,439,636 | 3/1984 | Newkirk ............................ 379/144 |
| 4,750,201 | 6/1988 | Hodgson et al. ................... 379/144 |
| 4,893,330 | 1/1990 | Franco ................................ 379/91 |
| 4,953,195 | 8/1990 | Ikemori ............................. 379/33 |
| 4,972,461 | 11/1990 | Brown et al. ........................ 379/91 |

FOREIGN PATENT DOCUMENTS

8702208 4/1987 World Int. Prop. O. ............ 379/91

*Primary Examiner*—James L. Dwyer
*Assistant Examiner*—Wing F. Chan
*Attorney, Agent, or Firm*—Dwight A. Marshall

[57] ABSTRACT

Apparatus for enabling a telephone network to establish connections between calling and called telephones in accordance with called telephone numbers identified with ones of a plurality of calling party credit cards. The apparatus is connected by data links with data bases maintained by each of the credit card companies and each credit card company is identified by a credit card number received from a calling party. The received credit card number is transmitted over a data link to a data base maintained by a credit card company identified as having issued a credit card assigned the received credit card number for an on-line determination of the calling party credit card. The data links are monitored and the telephone network is controlled to transmit an announcement to calling parties using credit cards issued by a credit card company maintaining a data base when there is a malfunction of a data link between the telephone network and the identified credit card company data base or if the credit card is identified as invalid.

36 Claims, 9 Drawing Sheets

| CREDIT CARD IDENTITY | | | ← 1010 |
|---|---|---|---|
| MATCH | CREDIT CARD CO | VALIDATION DATA LINK | |
| 891288 | 1 | 1050 | |
| 4XXXXX | 2 | 1051 | |
| 52XXXX | 3 | 1052 | |
| 340349 | 4 | 1053 | |
| 620XXX | 5 | 1054 | |

*FIG. 3*

| ACTIVE LINK 1050 FAILURES | | | | | ← 1011 |
|---|---|---|---|---|---|
| NUMBER OF 1ST TIMER COMPLETIONS | THRESHOLD | REQUESTS ACCEPTED | 1ST TIME INTERVAL (SECONDS) | TIME PERIOD (SECONDS) | |
| 9 | 20 | 1 | 1 | 5 | |
| 71 | 70 | 1 | 10 | 50 | |
| 80 | 90 | 1 | 20 | 500 | |

TELEPHONE NETWORK CREDIT CARD CALLING APPARATUS AND METHOD OF TELEPHONE NETWORK OPERATION WITH CREDIT CARD COMPANIES

This application is a continuation of application Ser. No. 07/636,535, filed on Dec. 31, 1990, now abandoned.

FIELD OF THE INVENTION

The invention relates to a telephone network and a method for controlling the telephone network to establish telephone connections in response to dialed telephone numbers identified with calling party credit cards.

BACKGROUND AND PROBLEM

Telephone networks are intended to respond to a telephone number dialed from a calling telephone by establishing a connection in response to the dialed telephone number between the calling telephone and a called telephone identified by the dialed telephone number. Traditionally, a telephone network identifies the calling telephone and generates billing information that is subsequently transmitted to a subscriber in whose name the calling telephone is listed for payment or a request is made to a calling party at a coin telephone station to deposit coins in payment for the telephone call.

Credit cards, such as the AT&T Universal Credit Card, enables a customer having such cards to dial a telephone number of a called telephone and transmit the customer credit card number via the calling telephone to the telephone network. A determination of the validity of a credit card associated with the received credit card number enables the telephone network to establish a telephone connection between calling and called telephones and the credit card customer is billed for the telephone call on the customer's credit card billing statement.

The telephone network determines validity of the credit cards associated with received credit card numbers by maintaining data link connections with credit card companies having issued the customer credit cards. A credit card number received from a calling party is transmitted over a data link to a data base maintained by a credit card company having issued the credit card identified by the received credit card number. The telephone network receives validation of the credit card over the data link. A problem occurs when there is a malfunction of the credit card company data base or of the data link extending between the telephone network and a credit card company in that it becomes impossible to determine the validity of a credit card. Since telephone calls can only be completed after the validity of a credit card has been determined, other problems arise during the interruption of these data links in that calling parties are inconvenienced and the telephone network suffers a lost of revenue until the data link can be reestablished between the telephone network and the credit card company data base.

SOLUTION

The foregoing problems are solved by monitoring data links between the telephone network and the credit card companies. When there is a malfunction of a data link and data base coupled therewith, the telephone network is controlled to transmit an announcement to calling parties using credit cards issued by a credit card company served by the data link denying call attempts during the malfunction.

Apparatus and method for enabling a telephone network to establish connections between calling and called telephones in accordance with called telephone numbers identified with calling party credit cards comprises data links connected with data bases maintained by credit card companies each identified by a credit card number received from a calling party. The data links transmit the received credit card number from the telephone network to an identified credit card company data base and receive a determination of validity of a credit card assigned the received credit card number. Apparatus monitors the transmitting and receiving data links and is enabled upon determining a malfunction thereof with any one of the data bases for controlling the telephone network to transmit an announcement to calling parties using credit cards issued by a credit card company maintaining the one data base denying call attempts on the telephone network during the malfunction interruption.

DETAILED DESCRIPTION

Figure 1:
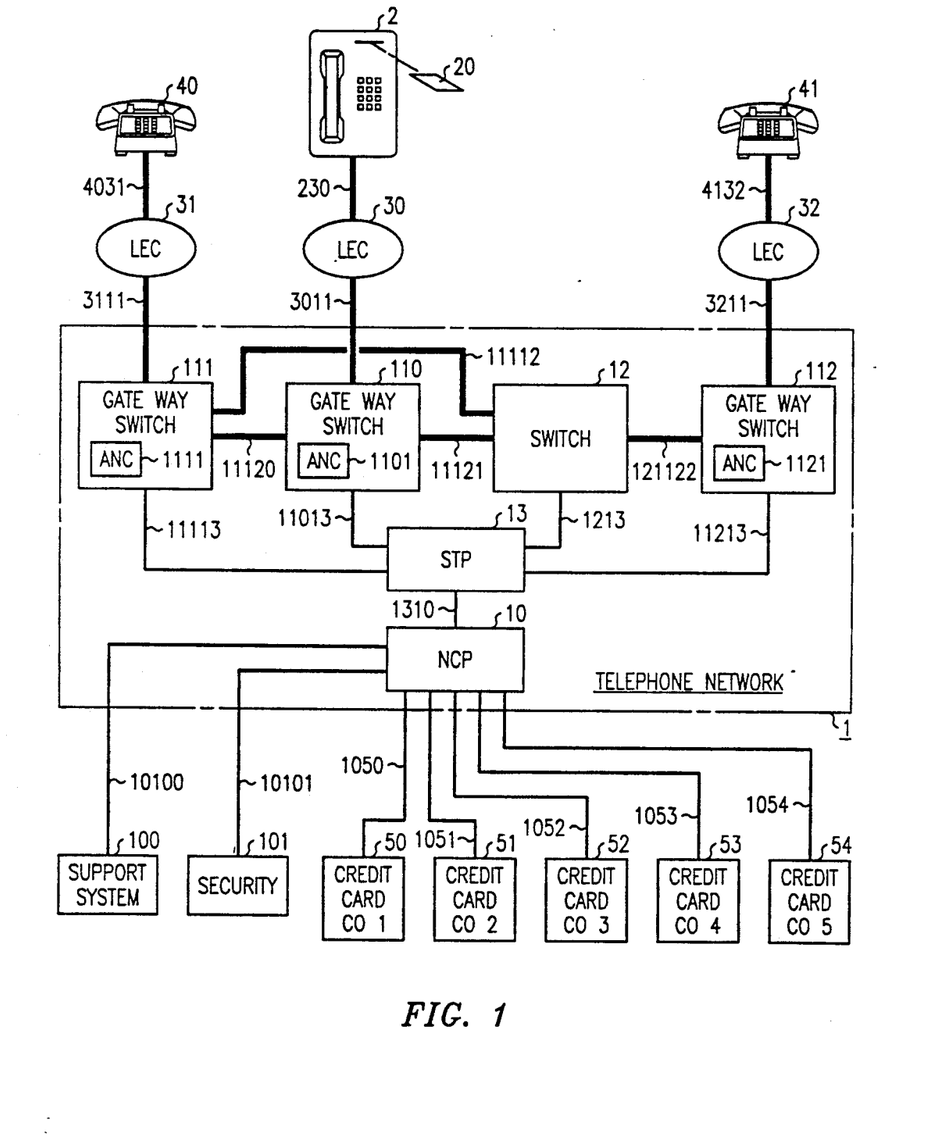
FIG. 1 illustrates an embodiment of a telephone network in accordance with the principles of the invention for establishing telephone connections in response to dialed telephone numbers identified with credit card numbers verified by validity messages exchanged with credit card company maintained data bases.

In an exemplary embodiment of the invention, telephone network 1 is arranged to establish connections between calling and called telephones 2, 40, 41 in accordance with dialed telephone numbers identified by calling party credit cards. Telephone network 1 may be any one of a number of telephone networks such as the well-known AT&T telephone network and need not be described in detail for an understanding of the invention. Typically, such telephone networks have switches 110, 111, 112 and 12 which may be controlled by data messages transmitted by signal transfer point (STP) 13, via data links 11013, 11113, 11213 and 1213, to set up telephone connections on network trunks 11120, 11121, 11112 and 121122 between calling and called telephone stations served by network 1. Certain ones of the telephone network switches may be designated gateway switches 110, 111, 112 and function to enable access of local exchange carriers 30, 31, 32, such as local telephone companies, access to telephone network 1. Gateway switches 110, 111, 112 may be any of a number of well-known types of telephone switching equipment, such as AT&T 4 ESS ™ and 5 ESS ® electronic equipment switching systems or automated operator systems, arranged to selectively interconnect trunks 3011, 3111, 3211 incoming from local exchange carriers 30, 31, 32 with network trunks 11112, 11120, 11121, 121122.

Each telephone network switch 12, 110, 111, 112 is interconnected by data links 1213, 11013, 11113, 11213 of the well-known common channel signaling network with a STP 13 which is arranged to exchange data messages with telephone network switches 12, 110, 111, 112 and which data messages are used to control telephone network switches 12, 110, 111, 112 to interconnect calling telephone 2 with called telephones 40, 41. Telephone network 1 is also assumed to have a number of centralized data bases, sometimes called network control points 10, positioned at various locations within telephone network 1 and interconnected either directly by data links similar to data links 1213, 11013, 11113, 11213 to network switches 12, 110, 111, 112 or by data link 1310 to STP 13.

Figure 2:
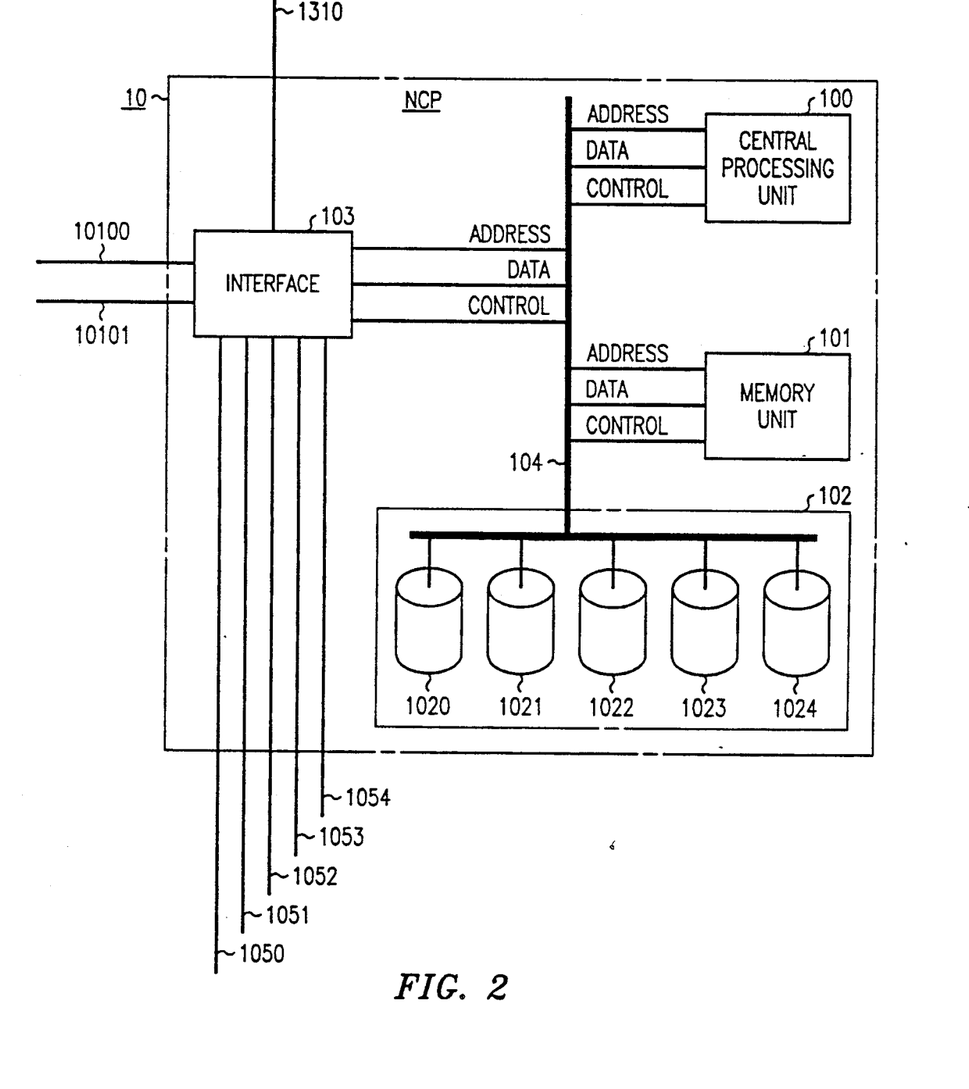
FIG. 2 is a block diagram of the network control apparatus used in the telephone network for identifying valid ones of the credit card numbers, FIGS. 3 and 4 set forth an illustrative section of subroutine data recorded in the memory of the network control apparatus set forth in FIGS. 1 and 2, and FIGS. 5 through 10 illustrate flow charts of the operation of the network control apparatus set forth in FIGS. 1 and 2 in accordance with principles of the invention.

NCP 10, FIG. 2, has a computer that may be, although not limited thereto, a computer such as an AT&T 1B or 3B20 simplex or duplex computer. Such computers need not be described in detail for an understanding of the invention and in general have a programmed central processing unit 100, memory unit 101 and an interface unit 103 each connected by address, data and control leads to a data bus 104. Interface unit 103 couples data links 1310 interconnected with STP 13, FIG. 1, data links 10100, 10101 interconnected with support system 100 and security system 101, respectively, and data links 1050 through 1054 interconnected with data bases 50 through 54 owned and maintained by various credit card companies with data bus 104 so that data may be exchanged with central processor unit 100 and memory unit 101. Data bus 104, FIG. 2, is also interconnected with mass data storage device 102 which includes data base infrastructures 1020 through 1024 interconnected by address, data and control leads with data bus 104.

Support system 100, FIG. 1, coupled with data link 10100, may be any of a number of well-known computer terminals used for operation with mainframe computers or smaller computers, sometimes referred to as personal computers, that are coupled to interface unit 103, FIG. 2, so that update and maintenance data may be entered into and read from central processor unit 100, memory unit 101 and data base infrastructures 1020 through 1024. Similarly, security system 101, FIG. 1, coupled with data link 10101, may be any of a number of well-known computer systems or terminals, sometimes referred to as personal computers, coupled to interface unit 103. Information in the form of security data relating to fraudulent credit cards or the use thereof may be entered into and read from central processor unit 100, memory unit 101 and data base infrastructures 1020 through 1024.

Credit card companies CO 1 through CO 5, FIG. 1, may be any bank or financial company having issued credit cards identified by a credit card number and which companies have unique, national or international data bases 50 through 54 associated therewith. Each credit card company data base has the identity of each credit card and associated credit card number issued by the credit card company stored therein along with information identifying the current validation or non-validation status of the credit card. The credit card company data bases 50 through 54 are each connected by a data link 1050 through 1054 with telephone network 1 via NCP 10. Data bases 50 through 54 may be, although not limited thereto, any of a number of well-known independent computer systems that are coupled by their associated data links 1050 through 1054 to interface unit 103, FIG. 2, of NCP 10.

Figure 3:
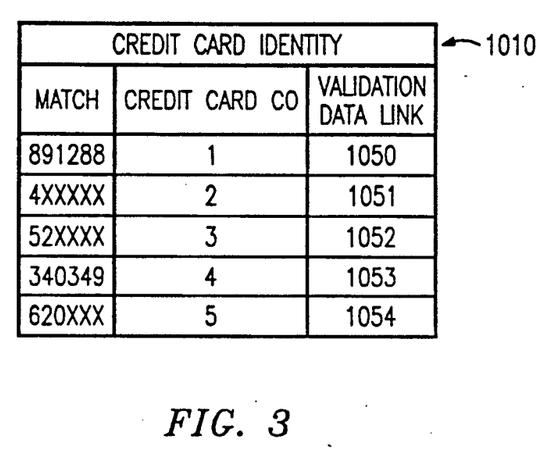
Figure 4:
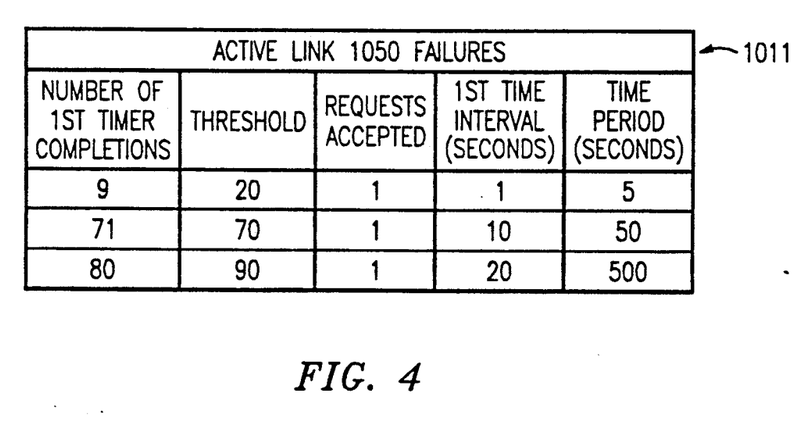

Memory unit 101 is used to store programs that control central processor unit 100 in the operation of NCP 10 and along with mass data storage device 102 to store data such as subroutines 1010 and 1011, FIGS. 3 and 4, that are used in association with programs controlling the operation of central processor unit 100.

In the instant embodiment of the invention, FIG. 1, it is assumed that a calling party is located at telephone 2 which is connected by a telephone line 230 to and is served by a local telephone company hereinafter called local exchange carrier 30. Local exchange carriers 30, 31, 32 are connected by trunks to telephone network switches each of which are herein identified as gateway switches 110, 111, 112 and serve to interface local exchange carriers 30, 31, 32 with telephone network 1.

Telephone 2 may be a standard telephone station, a public coin telephone station or a special telephone station arranged to accept a calling party credit card in order that the calling party may place a telephone call on telephone network 1. A calling party initiates a telephone call to a called telephone 40, 41 by placing telephone 2 in an off-state condition and, in the well-known manner, dialing the telephone number of a called telephone 40, 41 followed by the credit card number of a calling party credit card 20. The dialed telephone number and credit card number is received by serving local exchange carrier 30 over telephone line 230. A switching office of local exchange carrier 30, having received the dialed information, generates the telephone number assigned calling telephone 2 and transmits the dialed telephone number and credit card number along with the generated calling telephone number over trunk 3011 to gateway switch 110. In the event a calling party generates the telephone call through a telephone network operator, the operator requests that the credit card number be verbally or electronically sent over the telephone connection after transmission of the dialed calling and called telephone numbers and is subsequently received by gateway switch 110.

Gate way switch 110 responds to receipt of the called and calling telephone numbers and to receipt of the credit card number by formulating a data message containing the received credit card number and, depending upon the specific application, the identified telephone number of calling telephone 2 and the dialed or called telephone number, and transmits the data message over data link 11013 to STP 13. STP 13, in turn, transmits the received data message over data link 1310 to NCP 10.

In accordance With the illustrious embodiment of the invention, NCP 10 is programmed for use with telephone network 1 for controlling telephone network 1 to establish connections between calling telephone 2 and called telephones 40, 41 in accordance with dialed telephone numbers identified with calling party credit cards 20. Data links 1050 through 1054, connected with data bases 50 through 54 maintained by credit card companies CO 1 through CO 5, respectively, are used for transmitting the received credit card number to an identified credit card company data base. In return, an answer message is received within a predetermined interval of time indicating a determination of the validity of a credit card assigned the received credit card number. NCP 10 monitors each data link 1050 through 1054. When NCP 10 determines a malfunction, such as an interruption of continuity, with any one of the data links 1050 through 1054, or with a data base structure 50 through 54 coupled with a data link, NCP 10 responds to the malfunction by controlling telephone network gateway switches 110, 111, 112 to transmit an announcement to calling parties using credit cards issued by a credit card company maintaining the data base denying call attempts requested of telephone network 1 and controlling the flow of validity request messages to the credit card company during the malfunction.

Upon receipt of the data message incoming on data link 1310, FIG. 2, central processor unit 100 of NCP 10, operating in accordance with programmed instructions stored in memory unit 101 and mass store 102, reads the data message, via data bus 104, into memory unit 101. Each credit card company has a unique identification stratagem for identifying credit cards issued to their card holders. For example, it is assumed that credit card company CO 1, FIG. 3, has a portion in each of their credit cards having the number 891288 for use in identifying credit cards issued by credit card company CO 1. Subroutine 1010 also identifies that data link 1050, FIG. 1, interconnects NCP 10 with credit card company CO 1 data base 50 and is to be used in determining the validation of a credit card company CO 1 credit card used in placing a telephone call on telephone network 1. Subroutine 1010, FIG. 3, also identifies fields 4XXXXX, 52XXXX, 340349 and 620XXX identifying credit cards issued by credit card companies CO 2 through CO 5, respectively, and the associated validation data links 1051, 1052, 1053, 1054 interconnecting NCP 10, FIG. 1, with each credit card company data base 51 through 54.

NCP 10 monitors each data link 1050 through 1054 and is enabled upon determining a malfunction, such as an interruption of continuity of any one data link connected with one of the data base structures 50 through 54 for controlling telephone network 1, to transmit an announcement to calling parties using credit cards issued by a credit card company maintaining the data base denying call attempts on telephone network 1 during the malfunction interruption.

Figure 5:
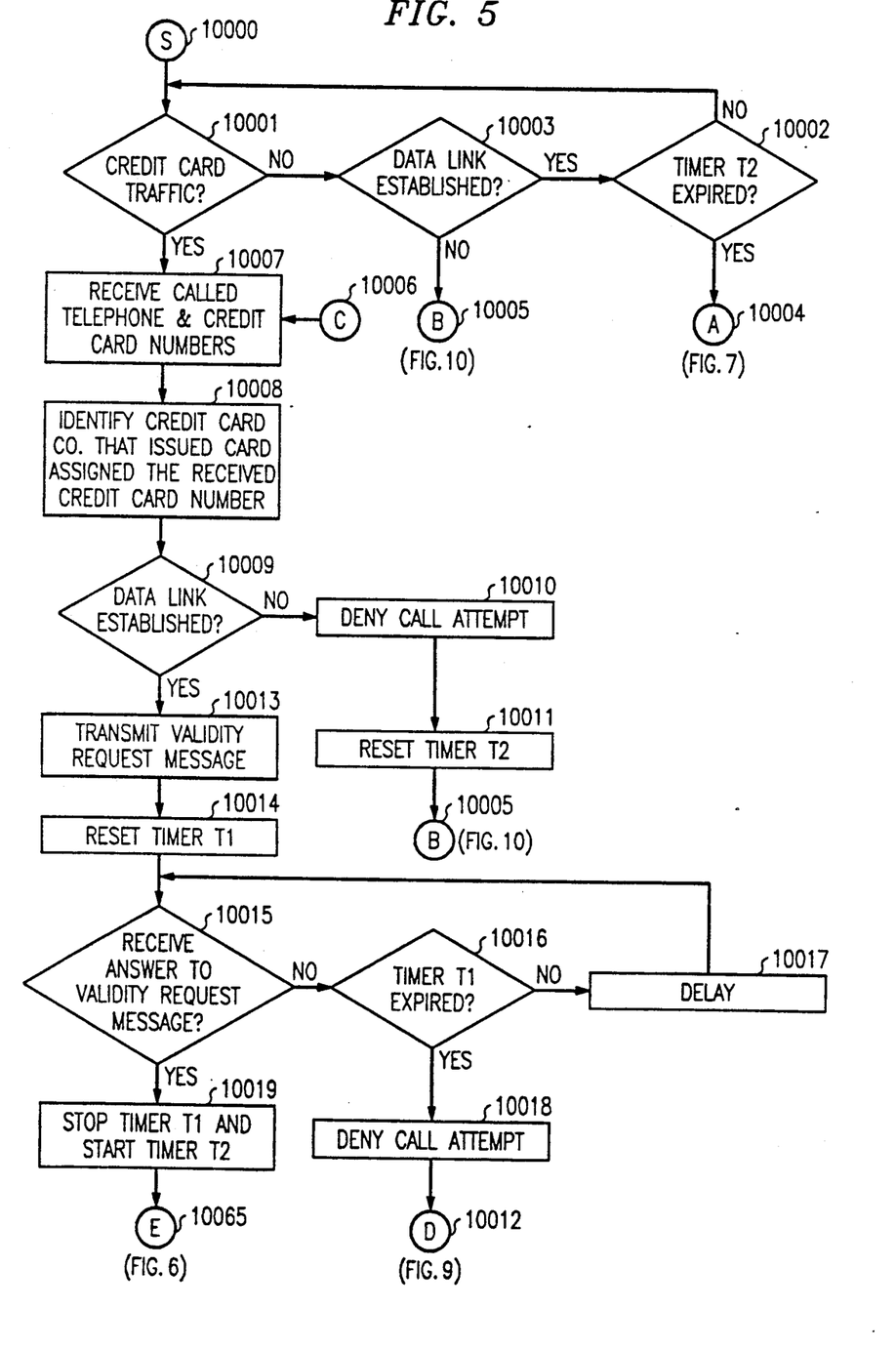

Upon starting the monitoring operation, for example on data link 1050, NCP 10, FIG. 5, step 10000, determines if there is any current data traffic between NCP 10 and credit card company CO 1, step 10001. In the event data link 1050 has not been established or has a fault, steps 10003, 10005, NCP 10 initiates a sequence to monitor the establishment of a data link by setting an attempt counter to 1, FIG. 10, step 10053. A data link connection request message is prepared and transmitted to credit card company CO 1 data base 50 and timer T1 starts a timing sequence, steps 10054, 10055. During the timing sequence, NCP 10 determines if an answer has been received, step 10056. If an answer has not been received and timer T1 has not expired, step 10057, NCP 10 waits for an appropriate delay time, step 10058, and then again determines if an answer has been received, step 10056.

Figure 10:
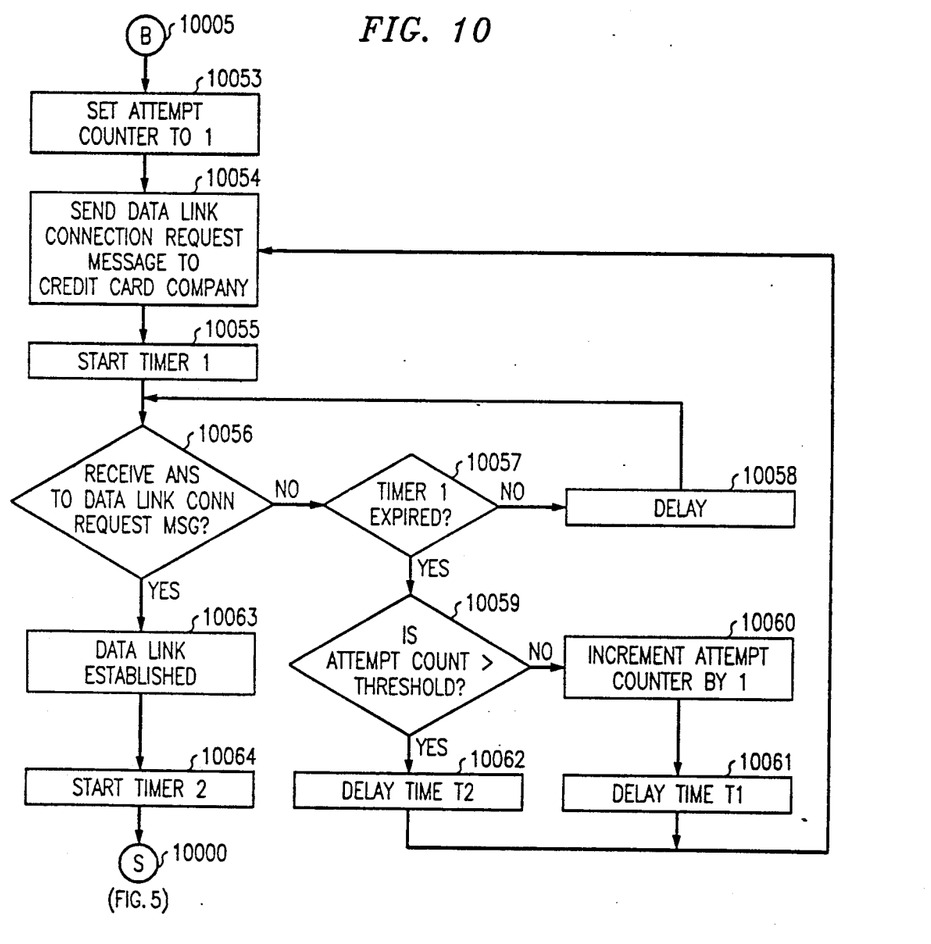

When an answer to the data link connection request message is received, step 10056, NCP 10, FIG. 1, determines that data link 1050 has been established between telephone network 1, via NCP 10, and data base 50 maintained by credit card company CO 1, FIG. 10, step 10063. Timer T1 is stopped and timer T2 is reset and started, step 10064, and the sequence restarted, step 10000. In the event that an answer is not received in response to the transmitted data link connection request message and timer T1 expires, steps 10056, 10057, NCP 10 determines if the attempt counter is greater than a predetermined threshold, step 10059. When the value of the threshold counter is less than a predetermined value, the attempt counter is incremented by 1, step 10060 and NCP 10, after a time delay T1, step 10061, repeats the sequence by transmitting another data link connection request to credit card company CO 1, step 10054. Steps 10054 through 10061 are repeated until either an answer is received to the transmitted data link connection request message, step 10056, or the incremented attempt counter becomes greater than the predetermined value of the threshold, step 10059. Once the threshold value is exceeded, step 10059, NCP 10 waits for a time period T2, step 10062, greater than time delay T1, then continuously repeats steps 10054 through 10059, 10062 until an answer is received in response to the transmitted data link connection request message, step 10056. Thus, when it is determined that data link 1050, FIG. 1, has not been established, NCP 10 establishes data link 1050 between telephone network 1 and data base 50.

Figure 7:
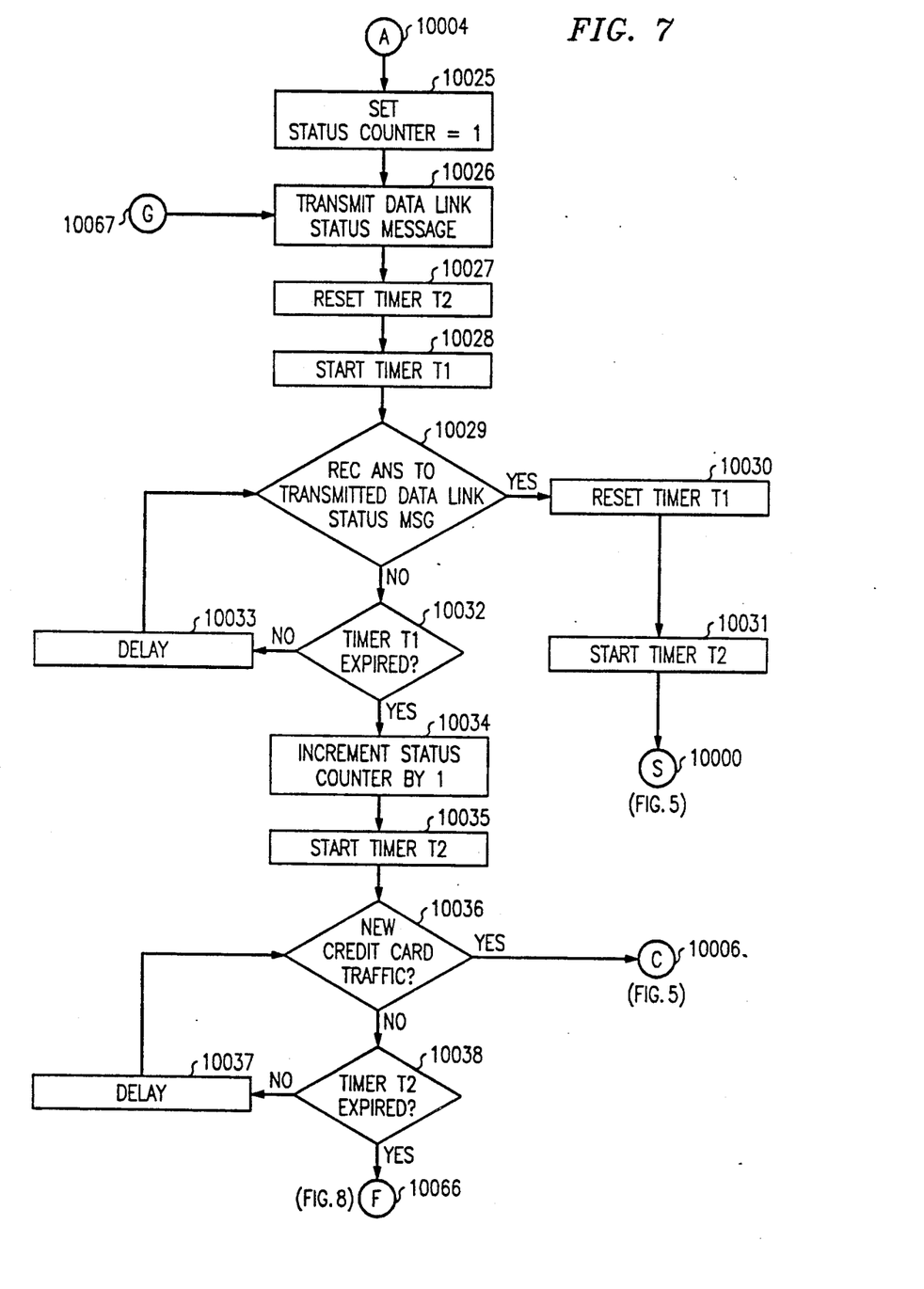

When it is determined that data link 1050, FIG. 5, has been established and timer T2 has not expired, steps 10003, 10002, NCP 10 continues to repeat steps 10001 through 10003. Upon the expiration of timer T2, step 10004, NCP 10, operating in accordance with the principles of the invention, determines an activity status of established data link 1050 by initially setting status counter to 1, FIG. 7, step 10025. A data link status message, step 10026, is transmitted over data link 1050 to data base 50. Timer T2 is reset and timer T1 initiates a timing sequence, steps 10027, 10028. If the established data link 1050 is active as evidenced by the return of an answer to the transmitted data link status message, step 10029, timer T1 is reset and timer T2 is started indicating that established data link 1050 is active, steps 10030, 10031.

Figure 8:
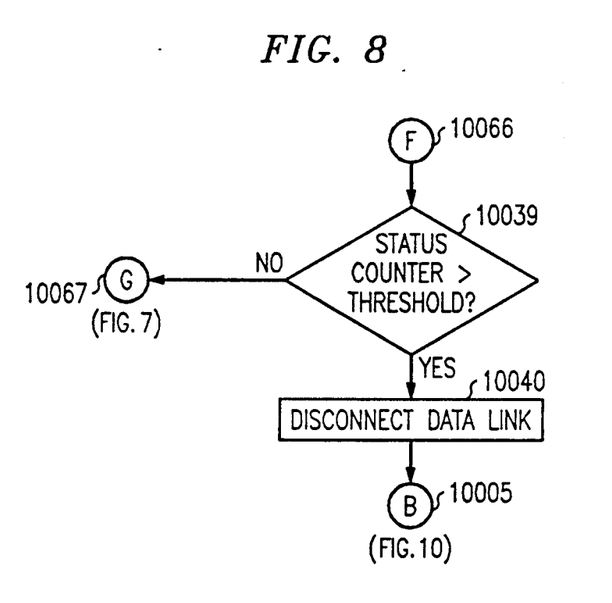

Steps 10029, 10032 and 10033 are repeated until either an answer has been received in response to the transmitted data link status message or timer T1 has expired. Upon expiration of timer T1, step 10032, the status counter is incremented by 1 and timer T2 starts a timing sequence, steps 10034, 10035. NCP 10 then determines if there is any new credit card traffic, step 10036. If timer T2 has not expired, steps 10039, 10037 and 10036 are repeated until it is determined that there is either new credit card traffic, step 10036, or timer T2 has expired, step 10038. After timer T2 has expired, step 10038, it is determined if value of the status counter is greater than a predetermined threshold value assigned the status counter, FIG. 8, step 10039. If the status counter value is less than the threshold value, FIG. 7, steps 10026 through 10029 are repeated to transmit another data link status message to credit card company data base 50. If an answer is not received in response to the transmitted data link status message, steps 10034 through 10039 are repeated until either there is new credit card traffic, step 10036, at which time NCP 10 receives new credit card traffic, step 10006, or the value of the status counter is greater than the predetermined threshold value, step 10039, FIG. 8. When the status counter threshold value is exceeded, data link 1050 disconnect, step 10040, is initiated and NCP 10 returns to initiate a reestablishment of data link 1050, step 10005. When data link 1050 is established and it is determined that there is an active status of data link 1050, FIG. 5, NCP 10 receives the called telephone number and credit card number, step 10007, from telephone network 1. In response to receipt of the called telephone number and credit card number, NCP 10 identifies the credit card company having issued a credit card assigned the received credit card number, step 10008. If a data link is not established to a data base of the identified credit card company, step 10009, the call attempt is denied and timer T2 is reset, steps 10011, 10005. NCP 10, FIG. 1, prepares a message controlling gateway switch 110 of telephone network 1 to deny the call attempt. The prepared message is transmitted over data link 1310, via STP 13 and data link 11013 to gate way switch 110. Gate way switch 110 responds to receipt of the message by connecting announcement circuit 1101 to trunk 3011 to return an announcement to telephone 2 to inform the calling party that the call attempt is denied. NCP 10, FIG. 5, returns to the sequence, step 10005, to initiate a reestablishment of the data link, FIG. 10.

When it is determined that a data link has been established with the identified credit card company, FIG: 5, step 10009, NCP 10 transmits a request for validity of the credit card assigned the received credit card number message over the active data link to the credit card company data base, step 10013. Upon transmission of the credit card validity message, timer T1 is reset, step 10014, to establish a time interval in which to receive an answer thereto. Steps 10015, 10016 and 10017 are repeated until either an answer is received in response to the transmitted validity request message, step 10015, or timer T1 expires, step 10016.

Figure 6:
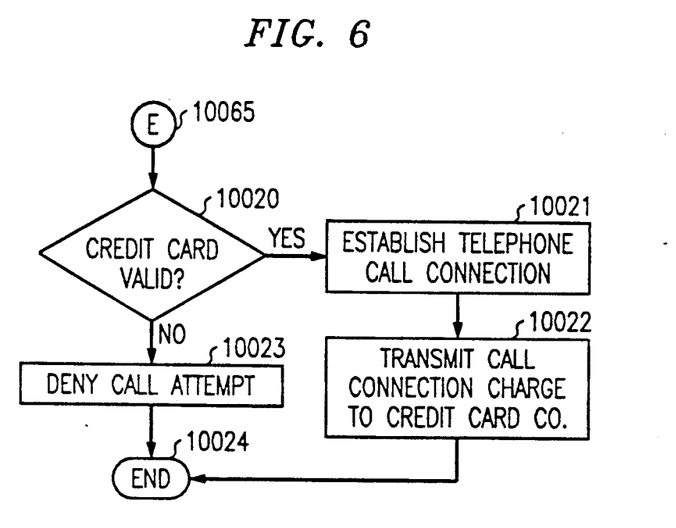

NCP 10 responds to receipt of a message in response to the transmitted validity message, step 10015, by stopping timing of timer T1 and starting timer T2, step 10019. When the received validity request message confirms validity of the identified credit card, FIG. 6, step 10020, NCP 10 prepares messages that are transmitted to the appropriate gateway switches and switches of telephone network 1 via STP 13 to control the establishment of a call connection, step 10021, between calling and called telephones 20, 40, 41, FIG. 1. Charge information, FIG. 6, step 10022, relating to the completed telephone call connection, is transmitted to the identified credit card company so that an appropriate charge can be entered against the credit card customer account. If the received validity message, step 10020, invalidates the identified credit card, NCP 10, in the above set forth manner, prepares a message, step 10023, that is transmitted to gateway switch 110, FIG. 1, returning an announcement to calling telephone 2 that the call connection is denied. The call sequence is then ended, FIG. 6, step 10024.

When NCP 10 fails to receive an answer to the transmitted validity request message, FIG. 5, step 10015, and timer T1 expires, step 10016, a message, step 10018, is transmitted to gateway switch 110 of telephone network 1, FIG. 1, to return an announcement to calling telephone 2 that the request for a call connection has been denied.

NCP 10, operating in accordance with the principles of the invention, is enabled upon expiration of the time interval generated by timer T1, FIG. 5, step 10016, without having received an answer to the transmitted validity message to restrict transmission of credit card validity requests over active data link 1050 to data base 50. The transmission of validity request messages are restricted to specific time intervals during predefined time periods when a number of transmitted validity request messages remain unanswered exceed predefined thresholds. After failing to receive an answer to a transmitted validity request message and timer T1 expires, steps 10015, 10017, 10016, NCP 10 in the above set forth manner, controls the appropriate telephone network switch to return a denial announcement to the calling telephone and then enters the restriction sequence, step 10012.

Figure 9:
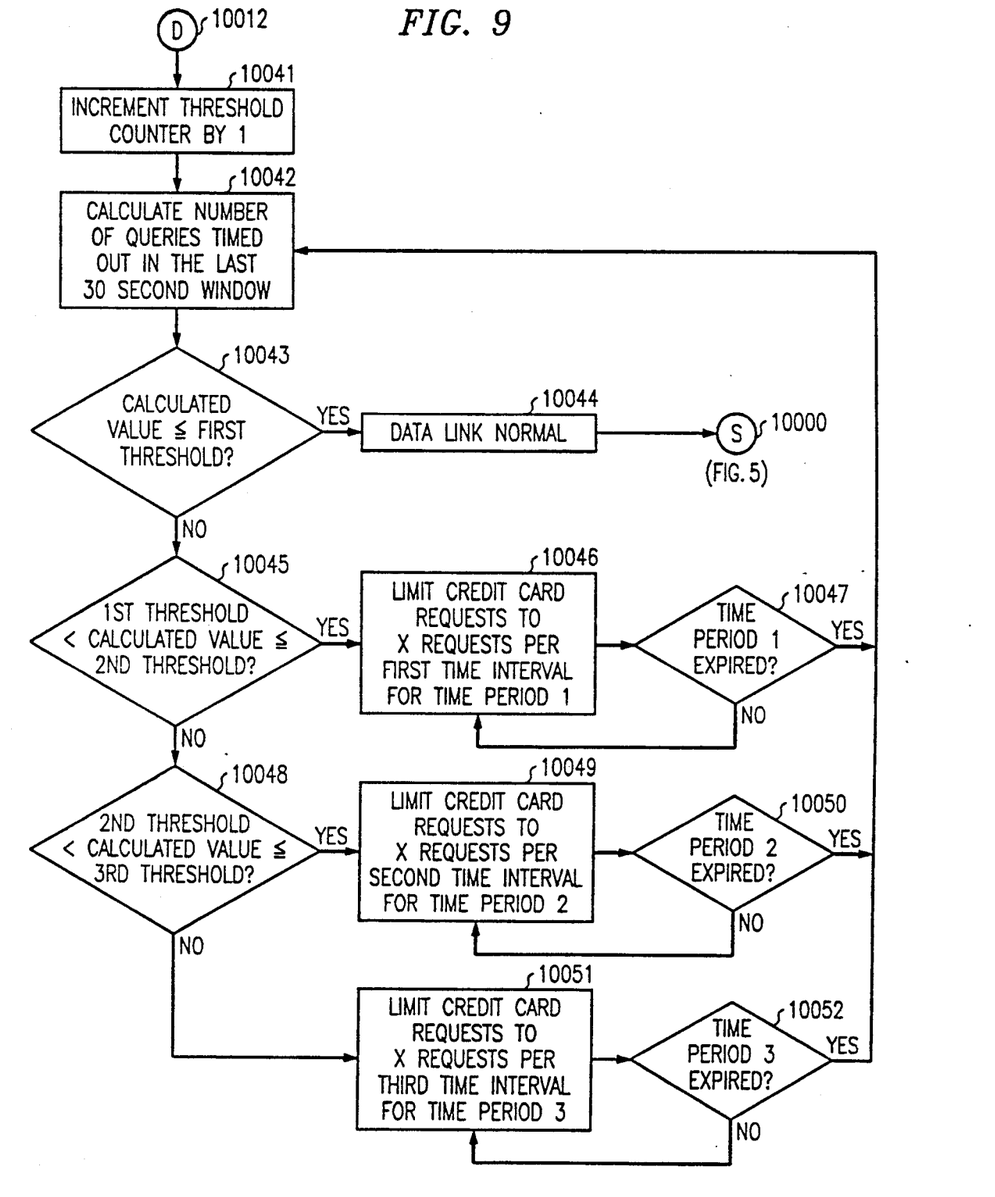

Upon entering the restriction sequence, FIG. 9, a threshold counter is incremented by one, step 10041, and a calculation is made of the number of validity request messages that have timed out in a 30 second window without receiving an answer, step 10042. If the calculation is equal to or less than a 1st threshold, step 10043, the data link is defined as being normal, step 10044, and the sequence returns to the start of the monitoring process, step 10000. Thus, each data link 1050 through 1054 may incur a limited number of momentarily failures and still be within normal operating limits.

Should the calculated value of time out failures exceed the 1st threshold, step 10043, the restriction sequence determines if the calculated value is greater than the 1st threshold and less than a 2nd threshold, step 10045. When the calculated value is within this range, step 10046, NCP 10 limits credit card request messages to X requests per a first time interval for a time period 1. In an illustrious example, subroutine 1011, FIG. 4, executed by central unit 100 of NCP 10, might determine that the calculated value is greater than the 1st threshold of 20 and less than the 2nd threshold of 70. In that event, transmission is restricted to one validity request message per each 1st time interval of 1 second for a total time period of 5 seconds. If the 5 second time period 1 has not expired, FIG. 9, step 10047, NCP 10 repeats step 10046 for the time interval of 5 seconds. Once the 5 second time period 1 has expired, step 10047, steps 10042 and 10043 are repeated until the monitored data link is returned to normal, step 10044.

When it is determined, step 10048, that the calculated value is greater than the 2nd threshold of 70, FIG. 4, subroutine 1011, but less than the 3rd threshold of 90, the restriction sequence limits credit card requests to 1 request per each 2nd time interval of 10 seconds for a total time period 2 of 50 seconds. When time period 2 expires after 50 seconds, FIG. 9, step 10050, the restriction sequence repeats steps 10042, 10043. If the calculated value is equal to or less than the 1st threshold, step 10043, the monitored data link, step 10044, is identified as being normal. When the value calculated in step 10042 exceeds the 3rd threshold, steps 10045, 10048, the restriction sequence, step 10051, limits credit card requests, FIG. 4, subroutine 1011, to 1 request per each 3rd time interval of 20 seconds for a total time period 3 of 500 seconds.

In an illustrative example set forth in subroutine 1011, it is assumed that data link 1050 has experienced 71 queries for validity requests that have timed out without receipt of an answer. The calculated value of 71 queries that occurred within a 30 second window, FIG. 9, step 10042, is greater than both the 1st and 2nd thresholds of 20, 70, respectively, FIG. 4, subroutine 1011, but less than the 3rd threshold of 90. Thus, the restriction sequence, FIG. 9, executes steps 10043, 10045, 10048 and 10051, so that 1 validity request message, FIG. 4, subroutine 1011 is accepted per each 3rd time period of 20 seconds for a total time period 3 lasting 500 seconds. When the calculated value becomes less than the 1st threshold, FIG. 9, step 10043, the data link is identified as having normal operation, step 10044.

Thus, upon identification of a credit card company having issued a received credit card number, NCP 10 determines that a data link has been established between telephone network 1 and a data base maintained by the identified credit card company. If it is determined that a data link has not been established with the identified credit card company, NCP 10 establishes the data link. When it is determined that the data link cannot be established, NCP 10 controls telephone network 1 switches to deny a call connection between the calling telephone 2 and called telephones and enables telephone network 1 to return an announcement to calling telephone 2 that the connection has been denied.

NCP 10, by monitoring the data link, determines an activity status of the established data link. Upon determining an active status of the data link, a request for the validity of the credit card assigned the received credit card number is transmitted over the active data link to the credit card company data base. A time interval is established after transmission in which to receive an answer to the transmitted credit card validity request message. After receipt of an answer to the transmitted validity request message confirming validity of the identified credit card, telephone network 1 is enabled to establish a call connection between the calling and called telephones. Upon receipt of an answer invalidating the identified credit card, NCP 10 directs telephone network 1 to deny the establishment of the requested call connection and to return an announcement to the calling telephone informing the calling party that the call connection has been denied.

In the event the time interval expires without having received the answer message, NCP 10, operating in accordance with the principles of the invention, restricts transmission of credit card validity request messages over the active data link to the credit card company data base to specific time intervals during predefined time periods in accordance with predefined thresholds. NCP 10 also determines failures of each data link. When detecting an inactive status of the data link, a link status message is transmitted at predetermined time intervals over the inactive data link to the credit card company data base. After failing to receive the transmitted link status message over the inactive data link, NCP 10 transmits other link status messages over the data link at first intervals of time and upon failure to receive the other link status messages, transmits subsequent link status messages over the inactive data link at second intervals of time. When there is a failure to receive the other and subsequent link status messages, NCP 10 controls telephone network 1 to deny establishment of requested call connections and to return an announcement to calling telephones informing calling parties attempting to place telephone calls using credit cards issued by the credit card company maintaining a data base coupled with the data link that call connections cannot be completed at the present time.

What is claimed is:

1. Apparatus for enabling a telephone network to establish connections between calling and called telephones in accordance with called telephone numbers identified with calling party credit cards wherein said apparatus comprises means actively connecting the telehone network with a plurality of data bases each maintained by a credit card company each identified by a credit card number received from a calling party for transmitting the received credit card number to an identified credit card company data base and for receiving a determination of validity from the identified credit card company of a credit card assigned the received card number required to complete each connection, and means for monitoring said active transmitting and receiving means and enabled upon determining a malfunction thereof with any one of the data bases for controlling the telephone network to selectively restrict transmission of credit card validity requests to the one data base and to transmit an announcement to calling parties using credit cards issued by a credit card company maintaining said one data base denying call attempts on the telephone network during said malfunction.

2. The telephone network call connection establishing apparatus set forth in claim 1 wherein said apparatus comprises means responsive to a receipt of a called telephone number and a credit card number for identifying a credit card company having issued a credit card assigned the received credit card number.

3. The telephone network call connection establishing apparatus set forth in claim 2 wherein said transmitting and receiving means comprises a plurality of data links each connecting the telephone network with a credit card company maintained data base.

4. The telephone network call connection establishing apparatus set forth in claim 3 wherein said monitoring means comprises means enabled upon an identification of a credit card company having issued the received credit card number for determining that a data link has been established between the telephone network and a data base maintained by the identified credit card company.

5. The telephone network call connection establishing apparatus set forth in claim 4 wherein said monitoring means comprises means enabled upon determining that the data link has not been established for establishing a data link between the telephone network and a data base maintained by the identified credit card company.

6. The telephone network call connection establishing apparatus set forth in claim 5 wherein said monitoring means comprises means enabled upon determining that the data link cannot be established for denying a connection between the calling and called telephones and for returning an announcement to the calling telephone that the connection has been denied.

7. The telephone network call connection establishing apparatus set forth in claim 6 wherein said monitoring means comprises means enabled upon determining the establishment of the data link for determining an activity status of the data link.

8. The telephone network call connection establishing apparatus set forth in claim 7 wherein said monitoring means comprises means enabled upon determining an active status of the data link for transmitting a request message for a validity determination of the credit card assigned the received credit card number over said active data link to the credit card company data base.

9. The telephone network call connection establishing apparatus set forth in claim 8 wherein said monitoring means comprises means enabled upon transmission of said credit card validity request message for establishing a time interval in which to receive an answer message in response thereto.

10. The telephone network call connection establishing apparatus set forth in claim 9 wherein said monitoring means comprises means enabled upon receipt of an answer message confirming validity of said identified credit card for enabling the telephone network to establish a call connection between the calling and called telephones and enabled upon receipt of an answer message invalidating said identified credit card for denying establishment of said call connection and returning an announcement to the calling telephone that the connection has been denied.

11. The telephone network call connection establishing apparatus set forth in claim 10 wherein said monitoring means comprises means enabled upon expiration of said time interval without having received said answer messages for restricting transmission of credit card validity requests over said active data link to specific time intervals occurring during predefined time periods when a number of said time expirations exceed predefined thresholds.

12. The telephone network call connection establishing apparatus set forth in claim 11 wherein said monitoring means comprises means enabled upon detecting a number of said time expirations in excess of a maximum threshold for determining a failure of the data link.

13. The telephone network call connection establishing apparatus set forth in claim 7 wherein said monitoring means comprises means enabled upon determining an inactive status of the data link for transmitting a link status message at predetermined time intervals over said inactive data link to the credit card company data base.

14. The telephone network call connection establishing apparatus set forth in claim 13 wherein said monitoring means comprises means enabled upon failure to receive a return of said link status message over the inactive data link for transmitting other link status messages over the data link at first intervals of time and upon failure to receive said other link status messages for transmitting subsequent link status messages over the inactive data link at second intervals of time.

15. The telephone network call connection establishing apparatus set forth in claim 14 wherein said monitoring means comprises means enabled during a failure to receive said other and subsequent link status messages from said credit card company maintained data base for disconnecting said inactive data link and denying establishment of connections and returning an announcement to calling telephones informing calling parties that call connections cannot be completed at the present time.

16. Apparatus connected with a telephone network for enabling the telephone network to establish connections between calling and called telephones in accordance with called telephone numbers identified with calling party credit card numbers wherein said apparatus comprises a plurality of data links each actively connecting the telephone network with one of a plurality of data bases each maintained by a credit card company each identified by a credit card number received from a calling party for transmitting the received credit card number to an identified credit card company data base and for receiving a determination of validity from the identified credit card company of a credit card assigned the received credit card number required to complete a connection, and means for monitoring each of aid active data links and enabled upon determining a malfunction thereof with any one of the data bases for controlling the telephone network to selectively restrict transmission of credit card validity requests to the one data base and to transmit an announcement to calling parties using credit cards issued by a credit card company maintaining said one data base denying call attempts on said telephone network during said malfunction.

17. The telephone network call connection establishing apparatus set forth in claim 16 wherein said monitoring means comprises means enabled upon identification of a credit card company having issued the received credit card number for determining that a data link has been established between the telephone network and a data base maintained by the identified credit card company and upon determining that the data link has not been established for establishing a data link between the telephone network and the data base maintained by the identified credit card company.

18. The telephone network call connection establishing apparatus set forth in claim 17 wherein said monitoring means comprises means enabled upon determining that the data link cannot be established for denying establishment of a connection between the calling and called telephones and for returning an announcement to the calling telephone that the connection has been denied.

19. The telephone network call connection establishing apparatus set forth in claim 18 wherein said monitoring means comprises means enabled upon determining the establishment of the data link for determining an activity status of the data link and upon determining an active status of the data link for transmitting a request message for validity of the credit card assigned the received credit card number over said active data link to the credit card company data base.

20. The telephone network call connection establishing apparatus set forth in claim 19 wherein said monitoring means comprises means enabled upon transmission of said credit card validity request message for establishing a time interval in which to receive an answer message in response thereto and enabled upon receipt of an answer message confirming validity of said identified credit card for establishing a call connection between the calling and called telephones and upon receipt of an answer message invalidating said identified credit card for denying establishment of said connection and returning an announcement to the calling telephone that the connection has been denied.

21. The telephone network call connection establishing apparatus set forth in claim 20 wherein said monitoring means comprises means enabled upon expiration of said time interval without having received said answer messages for restricting transmission of credit card validity request messages over said active data link to specific time intervals during predefined time periods when a number of said time expirations exceed predefined thresholds and enabled upon detecting an expiration of said time intervals in excess of a maximum threshold for determining a failure of the data link.

22. The telephone network call connection establishing apparatus set forth in claim 21 wherein said monitoring means comprises means enabled upon determining an inactive status of the data link for transmitting a link status message at predetermined time intervals over said inactive data link to the credit card company data base and enabled upon failure to receive said link status message over the inactive data link for transmitting other link status messages over the inactive data link at first intervals of time and upon failure to receive said other link status messages for transmitting subsequent link status messages over the inactive data link at second intervals of time.

23. The telephone network call connection establishing apparatus set forth in claim 22 wherein said monitoring means comprises means enabled during a failure to receive said other and subsequent link status messages from said credit card company maintained data base for denying establishment of connections and returning an announcement to calling telephones informing calling parties using credit cards issued by said credit card company that call connections cannot be completed at the present time.

24. Apparatus for enabling a telephone network to establish connections between calling and called telephones in accordance with called telephone numbers identified with calling party credit cards wherein said apparatus comprises means actively connecting the telephone network with a plurality of data bases each maintained by a credit card company each identified by a credit card number received from a calling party for transmitting the received credit card number to an identified credit card company data base and for receiving a determination of validity from the identified credit card company of a credit card assigned the received credit card number, and means for monitoring said active transmitting and receiving means and enabled upon expiration of a predetermined time interval without having received said determination of validity from the identified credit card company in response to said transmitted credit card number for selectively restricting transmission of received credit card numbers issued by the identified credit card company to said identified credit card company data base to specific time intervals during predefined time periods.

25. Apparatus for enabling a telephone network to establish connections between calling and called telephones in accordance with called telephone numbers identified with calling party credit cards wherein said apparatus comprises data links each connected with one of a plurality of data bases each maintained by one of a plurality of credit card companies each identified by a credit card number received from a calling party for transmitting the received credit card number to an identified credit card company data base and for receiving a determining of validity of a credit card assigned the received credit card number, and means for monitoring said data links and enabled upon determining an inactive status of a data link for transmitting link status messages at predetermined time intervals over said inactive data link to a credit card company data base coupled with said inactive data link and enabled upon failure to receive an answer to said link status messages over the inactive data link for denying establishment of connections and returning an announcement to calling telephones informing calling parties that call connections cannot be completed at the present time using credit cards issued by the identified credit card company.

26. Apparatus for enabling a telephone network to establish connections between calling and called telephones in accordance with called telephone numbers identified with ones of a plurality of calling party credit cards wherein said apparatus comprises a plurality of data links each connecting the telephone network with one of a plurality of data bases each maintained by a credit card company, means responsive to a receipt of a called telephone number and a credit card number for identifying a credit card company having issued a credit card assigned the received credit card number, means enabled upon the identification of the credit card company having issued the received credit card number for determining that a data link has been established between the telephone network and a data base maintained by the identified credit card company, means enabled upon determining that the data link has not been established for establishing a data link between the telephone network and the data base maintained by the identified credit card company, means enabled upon determining that a data link cannot been established for denying establishment of a connection between the calling and called telephones and for returning an announcement to the calling telephone station that the connection has been denied, means enabled upon determining the establishment of the data link for determining an activity status of the established data link, means enabled upon determining an active status of the data link for transmitting a request message for validity of the credit card assigned the received credit card number message over said active data link to the credit card company data base, means enabled upon transmission of said credit card validity request message for establishing a time interval in which to receive an answer message in response thereto, means enabled upon receipt of an answer message confirming validity of said identified credit card for establishing a call connection between the calling and called telephones and upon receipt of an answer message invalidating said identified credit card for denying establishment of said call connection and returning an announcement to the calling telephone station that said call connection is denied, means enabled upon expiration of said time interval without having received said answer messages for restricting transmission of credit card validity request messages over said active data link to the data base of the identified credit card company to specific time intervals during predefined time periods when a number of said time expirations exceed predefined thresholds, means enabled upon detecting a number of said time interval expirations in excess of a maximum predefined threshold for determining a failure of the data link, means enabled upon determining an inactive status of the data link for transmitting a link status message at predetermined time intervals over said inactive data link to the identified credit card company data base, means enabled upon failure to receive an answer message in response to said link status message for transmitting other link status messages over the data link at first intervals of time and upon failure to receive an answer message in response to said other link status messages for transmitting subsequent link status messages over the inactive data link at second intervals of time, and means enabled during a failure to receive said other and subsequent link status answer messages from said identified credit card company maintained data base for denying establishment of connections and returning an announcement to calling telephones informing calling parties using credit cards issued by the identified credit card company that call connections cannot be completed at the present time.

27. A method for enabling a telephone network to establish connections between calling and called telephones in accordance with called telephone numbers identified with any one of a plurality of calling party credit cards comprising the steps of transmitting a credit card number received with a called telephone number over one of a plurality of data links each actively connecting the telephone network with a plurality of data bases each maintained by a credit card company to a data base maintained by a credit card company identified as having issued the received credit card and receiving a determination of validity from the identified credit card company of a credit card assigned the received credit card number required for completion of a call connection, and monitoring each of said active data links and enabled upon determining a malfunction of one of said data links controlling the telephone network to selectively restrict transmission of credit card validity requests to the identified credit card company and to transmit an announcement to calling parties using credit cards issued by said identified credit card company denying call attempts on the telephone network during said malfunction.

28. The method for enabling a telephone network to establish connections between calling and called telephones in accordance with called telephone numbers identified with any one of a plurality of calling party credit cards as set forth in claim 27 wherein said monitoring step comprises the step of establishing a data link between the telephone network and the data base maintained by the identified credit card company upon determining that said one data link has not been established.

29. The method for enabling a telephone network to establish connections between calling and called telephones in accordance with called telephone numbers identified with any one of a plurality of calling party credit cards as set forth in claim 28 wherein said monitoring step comprises the steps of denying establishment of a connection between the calling and called telephones and for returning an announcement to the calling telephone that the connection has been denied upon determining that said one data link can not be established.

30. The method for enabling a telephone network to establish connections between calling and called telephones in accordance with called telephone numbers identified with any one of a plurality of calling party credit cards as set forth in claim 29 wherein said monitoring step comprises the step of determining an activity status of the established data link and upon determining an active status of the data link for transmitting a request message for validity of the credit card assigned the received credit card number over said active data link to the identified credit card company data base.

31. The method for enabling a telephone network to establish connections between calling and called telephones in accordance with called telephone numbers identified with any one of a plurality of calling party credit cards as set forth in claim 30 wherein said monitoring step comprises the step of establishing a time interval upon transmission of said credit card validity request message in which to receive an answer message in response thereto and establishing a call connection between the calling and called telephones upon receipt of said answer message confirming validity of said identified credit card within said time interval and denying establishment of said call connection and returning an announcement to the calling telephone that the connection has been denied upon receipt of an answer message invalidating said identified credit card.

32. The method for enabling a telephone network to establish connections between calling and called telephones in accordance with called telephone numbers identified with any one of a plurality of calling party credit cards as set forth in claim 31 wherein said monitoring step comprises the step of restricting transmission of credit card validity request messages over said active data link to specific time intervals during predefined time periods when a number of expirations of said established time interval exceed predefined thresholds occur without having received said answer messages and determining a failure of the data link upon detecting a number of said time expirations in excess of a maximum threshold.

33. The method for enabling a telephone network to establish connections between calling and called telephones in accordance with called telephone numbers identified with any one of a plurality of calling party credit cards as set forth in claim 32 wherein said monitoring step comprises the step of determining an inactive status of the data link and transmitting a link status message at predetermined time intervals over said inactive data link to the identified credit card company data base and upon failure to receive an answer message in response to said link status message transmitting other link status messages over the inactive data link at first intervals of time and upon failure to receive an answer message in response to said other link status messages transmitting subsequent link status messages over the inactive data link at second intervals of time, and denying establishment of connections and returning an announcement to calling telephones informing calling parties using credit cards issued by the identified credit card company that call connections cannot be completed at the present time during a failure to receive said other and subsequent link status messages from said credit card company maintained data base.

34. A method for enabling a telephone network to access a plurality of data bases each maintained by a credit card company and each connected by ones of a plurality of active data links with network control apparatus of the telephone network to establish connections between calling and called telephones in accordance with called telephone numbers and calling party credit card numbers received by the telephone network comprising the steps of transmitting each received credit card number as a validity request over ones of the active data links to data bases maintained by credit card companies identified as having issued the received credit card number and receiving over said one active data links from the data bases a determination of validity required for completion of a call connection, and monitoring each of the active data links at the network control apparatus and upon determining a malfunction of one of the data links controlling the telephone network to selectively restrict transmission of credit card validity requests to the identified credit card company maintained data base connected with the one data link and to transmit an announcement to calling parties using credit cards issued by said identified credit card company denying call attempts on the telephone network during said malfunction.

35. Network control apparatus coupled with a telephone network for enabling the telephone network to establish connections between calling and called telephones in accordance with called telephone numbers identified with calling party credit cards received by the telephone network from calling parties wherein said apparatus comprises a plurality of data links each actively connecting the network control apparatus with one of a plurality of data bases each maintained by a credit card company identified by a received calling party credit card number for transmitting a validity request to a data base maintained by a credit card company having issued the received credit card number and for receiving a determination of validity in response to the transmitted validity request to enable the telephone network to complete a connection, and means for monitoring each of said active data links and enabled upon determining a malfunction thereof with any one of the data bases for selectively restricting transmission of validity requests to the one data base connected with the one data link and to control the telephone network to transmit an announcement to calling parties using credit cards issued by a credit card company maintaining the one data base denying call attempts on said telephone network during said malfunction.

36. A telephone network for establishing connections between calling and called telephones in accordance with received called telephone numbers and calling party credit card numbers received by the telephone network wherein network control apparatus of the telephone network comprises a plurality of data links each actively connecting the network control apparatus with ones of a plurality of data bases each maintained by a credit card company identified by a received credit card number for transmitting each received credit card number as a validity request over one of the active data links to a data base maintained by a credit card company identified as having issued the received credit card number and for receiving over said one active data link from the credit card company maintained data base a determination of validity required for completion of a telephone network call connection, and network control apparatus for monitoring each of said active data links and enabled by a malfunction in receiving an answer of a validity determination in response to a transmitted validity request over one of the data links for selectively restricting transmission of credit card validity requests to the credit card company maintained data base connected to the one data link to specific time intervals occurring during predefined time periods and to transmit an announcement to calling parties using credit cards issued by said identified credit card company denying call attempts on the telephone network during said malfunction upon failing to receive a validity determination in response to transmitted validity requests.

* * * * *